United States Patent Office 3,282,055
Patented Nov. 1, 1966

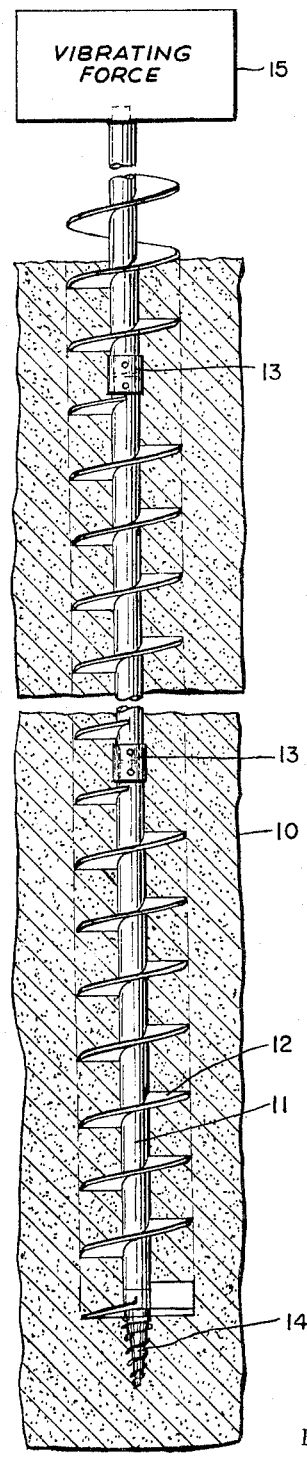

3,282,055
SOIL SETTLING METHOD
Richard E. Landau, Middle Village, N.Y.
(717 Cornwell Ave., Hempstead, N.Y.)
Original application July 2, 1958, Ser. No. 746,099, now Patent No. 3,096,622, dated July 9, 1963. Divided and this application Mar. 26, 1963, Ser. No. 267,967
5 Claims. (Cl. 61—36)

This application is a division of application Serial No. 746,099 and now Patent No. 3,096,622.

This invention relates to a method of consolidating or densifying granular soils. More particularly, the method comprises helically cutting into the earth formation to the desired level with a helical cutting implement having flight(s) along the length of the implement and causing the flight(s) to vibrate so as to act as antennae and radiate the vibration for a considerable distance beyond the area of the implement.

Granular soils having little or no cohesion can be compacted with or without applying external construction loads and without adversely affecting the physical characteristics of the soil. These soils can be densified by causing a re-orientation of the granular particles to form a more compact matrix structure. Depending upon the grain size involved, the matrix structure is often found to be flocculated, honeycombed, bulked, or in an otherwise less than dense condition. These loose materials hold their from by pressure between the grains (intergranular pressure), which is effected by moisture in the material and by the frictional resistance of one particle sliding over another.

In order to effect a densification of this material, it is necessary to overcome the existing intergranular forces between the particles, which can be accomplished readily by means of vibration and thereby allowing the particles to re-orient themselves in a more dense pattern by their own weight or superimposed loading.

It has been discovered that the consolidation and densification of such soils may be accelerated by using a helical flight implement such as a helical auger. This method comprises cutting into the earth formation to the desired level with the implement and causing the implement to vibrate, so that the large surface area of the flight(s) act as antennae and radiate the vibration for a considerable distance beyond the area of the implement. Once the intergranular friction due to soil weight and capillary stress are overcome, the granular particles will, of their own weight, reorient themselves to a more dense and stable matrix formation. The frequency of vibration applied to the implement would depend upon the construction of the implement and the type of soil formation involved, and can be determined by those familiar with the art.

The drawing is an illustration of a type of cutting implement useful in carrying out the method of invention.

The earth formation 10 is shown penetrated by an auger 11 which has helical flights 12. For convenience, the auger may be composed of plural sections joined by the couplings 13. The lower end of the augur is fitted with a smaller tapered screw section 14 which aids in starting the boring operation with the auger. A vibrating means 15 is affixed to the upper end of the auger to cause the auger to vibrate in accodance with the invention.

Vibration of the cutting implement may be in a vertical or horizontal direction or any intermediate altitude therebetween. Any suitable vibrating means may be employed, such as, for example, a pneumatic vibrator, electrical vibrator, or other means inserted into a hollow-shafted auger, for example, or added to the solid shaft of the implement, or added externally to the implement flights or the entire mechanism.

In the event that is is desired to add water or other materials to the soil, a hollow shaft implement would be used for such insertion.

The implement is initially inserted in the ground by rotating same, thus permitting it to cut through the soil formation. As the vibration step is continued, the soil is compacted for a considerable distance beyond the implement location. If desirable, vibration may be continued as the implement is withdrawn.

The prior systems of soil densification by vibration utilize a cylindrical vibrating means which is inserted into the soil by developing a "quick" condition, i.e., using water under pressure to cause the soil particles to separate. This system necessarily initially reduces the existing soil density. In these prior systems densification can only be effected after insertion of the vibrator is completed for reason that during insertion, the presence of excess water results in a separation of soil particles and consequently, the intergranular contact essential to density is reduced.

It is noted that after vibration the removal of the vibrator leaves an unsupported cavity in the soil below the vibrator. Oftentimes soil shift occurs to fill the cavity which results in a reduction in density of the soil previously densified. Such soil must then be revibrated, with the result that a step by step withdrawal of the vibrator is essential.

In the proposed new method, the lateral vibrating vanes not only provide a large surface contact area per unit volume of soil permitting a more efficient means of transferring energy (compacting effort) to the soil, but also serve as a means for effecting a penetration of the vibrator system into the soil without the use of water and the concomitant temporary reduction in adjacent soil density. Thus, there is no energy waste during the insertion process and the initial density of the soil adjacent the apparatus is not materially less than the pristine density of the soil.

It is desirable to backfill the cavity formed by withdrawal of the cutting implement so as to prevent collapse of the formation into the cavity and consequent decompaction of the soil. Backfilling may be accomplished either by conducting the fill material through the hollow shaft when a hollow-shafted implement is employed or by reversing the rotation of the cutting implement. In the latter case, reversal in the rotation of the flights and withdrawing the implement acts to fill the volume defined by the cutting implement. Reversal of the rotation of the vibrator and flight system will in itself act to reverse the penetration process causing the equipment to be self-extracting. Thus, although the equipment can be withdrawn by application of force, by incorporating the self-extracting sequence the weight of the equipment can be made to bear partially or fully on the soil backfill in the cavity, thereby providing an additional compactive effort in the backfill column and adjacent area. Fill material sufficient to compensate for the volume of the cutting implement may be added to the flight(s) during the reversed rotation step.

The method of this invention permits flexibility in the use of vibration as a means of soil densification without any substantial loss of efficiency. Densification of the soil can be effected during any phase of the insertion or withdrawal process or at any intermediate point whether continuous or discontinuous.

I claim:

1. A method of consolidating a granular earth formation comprising penetrating into the formation to the desired depth with an implement having an outwardly projecting vane or vanes and vibrating the vane or vanes for a period of time sufficient to accomplish the consolidation of the earth formation, said vane or vanes being operative as antenna to disseminate the vibrations through the earth formation.

2. The method of claim 1, and further including the step of back-filling the cavity caused by withdrawing the implement as the cavity is formed.

3. A method of consolidating a granular earth formation comprising penetrating into the formation to the desired depth with an implement having an outwardly projecting helical vane, which vane extends substantially the entire length of the implement, and vibrating the vane for a period of time sufficient to accomplish consolidation of the earth formation, said vane being operative as an antenna to disseminate the vibrations through the earth formation.

4. The method of claim 3 wherein the implement has a centrally disposed hollow shaft and wheerin the fill material is conducted through the shaft.

5. The method of claim 3 wherein the implement is an auger and the cavity formed by withdrawal of the auger is filled by a reverse rotation of said auger.

References Cited by the Examiner

UNITED STATES PATENTS

| | | | |
|---|---|---|---|
| 935,081 | 9/1909 | Wolfsholz | 61—36 |
| 2,229,912 | 1/1941 | Baily | 61—35 X |
| 2,729,067 | 1/1956 | Patterson | 61—35 X |
| 2,920,455 | 1/1960 | Ryser et al. | 61—53.62 X |

CHARLES E. O'CONNELL, *Primary Examiner.*

JACOB SHAPIRO, EARL J. WITMER, *Examiners.*